March 14, 1944. H. M. LEONARD 2,344,153
METHOD AND MEANS FOR ILLUMINATING OBJECTS
Filed Jan. 31, 1942
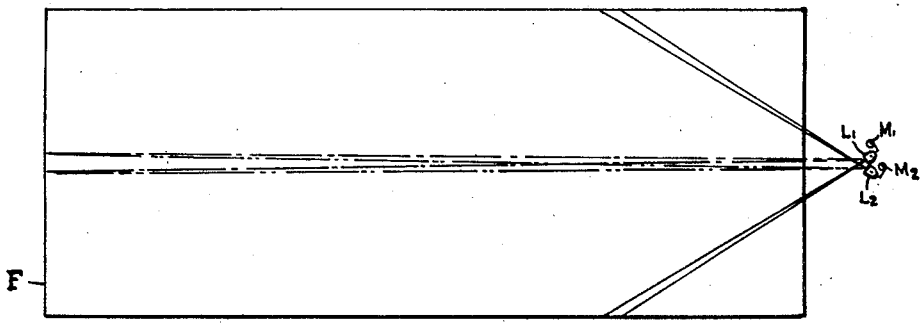
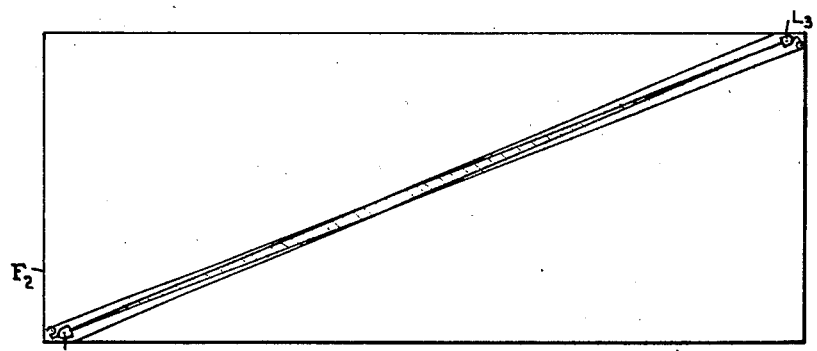
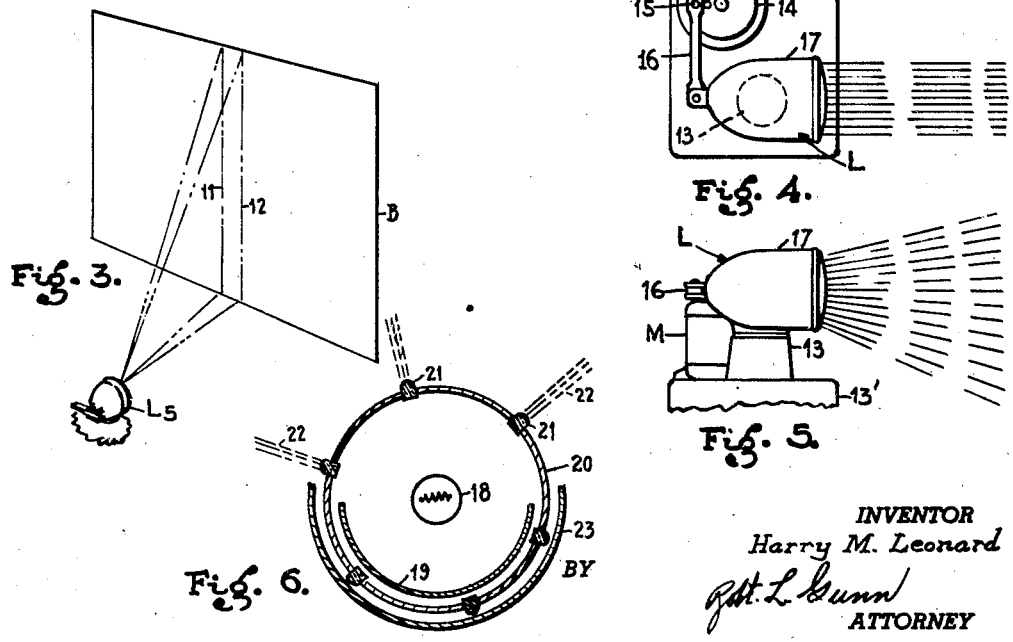
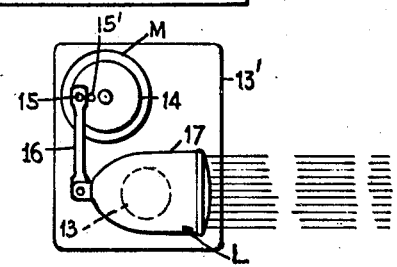
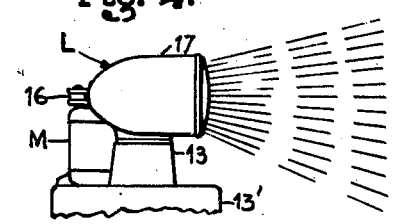
INVENTOR
Harry M. Leonard
BY
ATTORNEY Patented Mar. 14, 1944

2,344,153

UNITED STATES PATENT OFFICE 2,344,153

METHOD AND MEANS FOR ILLUMINATING OBJECTS

Harry Mills Leonard, Los Angeles, Calif., assignor of one-half to Robert L. Gunn, Los Angeles, Calif.

Application January 31, 1942, Serial No. 429,055

2 Claims. (Cl. 240—1.2)

This invention relates to a novel method and means for illuminating areas such as airplane landing fields, parks, playgrounds, billboards, buildings, skies, etc., and under proper conditions may be used for interior lighting.

The principal object of this invention is to increase visible illumination by taking advantage of a natural phenomenon of the eye. It is a well known fact that the eye, and particularly the human eye, is capable of retaining an image over a finite period of time. Tests have shown this period of time to be in the order of approximately one-seventh of a second. However, the present invention is not concerned with the time interval, since it is the inventor's purpose to make use of the retentive power of the eye in whatever form or order it occurs.

The concept of this invention is based upon the demonstrable fact that if a light is flashed on and off consecutively enough times per second it will appear as a steady light to the eye. This is due to the retentive power of the eye. The number of flashes per second will of course determine the amount of flicker present. If, therefore, the incident light is flashed, say in the order of seven times per second on a subject to be illuminated, the retentive power of the eye will hold each image of the reflected light until the next flash. The intensity will probably fall off somewhat during the dark interval, but the over-all effect is an apparent increase in the actual amount of light reflected, since successive flashes build up the intensity of the retained images before they have time to substantially deteriorate in the eye. In this manner the eye actually adds to the over-all value of the light and develops a substantially uniform image of high light intensity comparable to the intrinsic value of the original light source.

The conventional motion picture makes use of this power of the eye to produce action on the screen. I propose to make use of this power of the eye to amplify reflected light, which amounts to amplifying incident light. In the preferred form of my invention, I propose to condense light into a comparatively narrow beam of high intensity and to move this beam rapidly over the area to be illuminated. By giving the beam a finite width and a cyclical movement of sufficient frequency to eliminate flicker, I may set up a condition of lighting equivalent to a flashing light; that is, as the beam sweeps over the field it will suddenly illuminate a definite section of that field with high intensity and will as suddenly pass on to the next section. The result is equivalent to flashing a light of high intensity on each particular section. The eye will retain the image of any particular section of the field while the other sections of the field are being illuminated and, before this image materially deteriorates, the beam will again flash over the same section, restoring the image to its original high light intensity. The over-all result is a high intensity illumination over all sections of the field by means of a small concentrated light source. Under my invention, the number of lights used for conventional lighting of landing fields, etc., can be reduced to a few concentrated sweeping beams, thereby greatly reducing the power consumption and producing a superior illumination.

The apparatus for practicing my invention may take a variety of forms, but I recommend an apparatus wherein the highest concentrated value of light possible may be projected from the source in the form of a narrow beam. This may include projectors having parabolic reflectors with narrow cylindrical lenses, the whole of which may be oscillated to sweep the desired area, or it may include lights having shutters which pass a narrow beam of light in the manner desired; and, again, it may include rotating lenses or prisms with or without reflectors.

Other objects and advantages will become apparent as the description proceeds in conjunction with the drawing in which:

Figure 1 shows an application of my invention for lighting an airplane landing field;

Figure 2 shows another way in which my invention may be used to light an airplane landing field;

Figure 3 is a perspective view showing the manner in which I may utilize my invention to illuminate a billboard sign or the like;

Figure 4 is a top plan view of the light and the means for oscillating the same;

Figure 5 is an elevation of Figure 4; and

Figure 6 is a view of another means for producing a beam of light which sweeps over the object to be illuminated.

In the drawing I have illustrated my invention as being applied to illuminating an airplane landing field and a billboard. Other uses will become apparent to those skilled in the art, such as exterior building illumination, interior display illumination, sky illumination, etc.

In applying my invention to illuminating an airplane landing field, there are several different ways in which an oscillating or a flashing light may be applied to this class of illumination. In Figure 1, I have shown a field F having two lights L1 and L2 mounted at one end thereof. These two lights are arranged to be oscillated at a frequency which will cause the lights to sweep the field from side to side and illuminate the field without noticeable flicker. In Figure 1, I have shown two lights which, for purposes of construction, are identical and are driven by electrically interlocked means to cause them to oscillate oppositely to each other. By mounting the lights close to each other at one end of the field as shown and then by synchronizing the movement of the two lights so that they sweep the field oppositely from side to side, I may cause the illumination to spread over the field more uniformly and at the same time double the frequency of oscillation and thereby reduce flicker. Another result of using two lights resides in producing an intensified beam or path of light directly down the center of the field when the two light beams cross through each other. It is evident that, as the two beams coincide in passing through each other at the center of the field, an intensified light path will result. This may be used in an airplane field to indicate the runway or for any other purpose suitable. There is another advantage from using two lights which is not quite so obvious. In oscillating a light of the character described by means of a mechanical reciprocating arrangement, due to the acceleration curve of the crank shaft movement, the speed of the light travel is greatest as the light swings over the center of the field and slowest at the margins of the field. The result will probably be to increase the light at the margins of the field. To offset this effect, I may use two light beams of considerable width and have their beams cross at the center of the field, thereby increasing the light at the center of the field to produce a substantially uniform lighting over the entire field.

In Figure 2, I have shown a somewhat different arrangement of two lights. Here it will be noted I provide lights L3 and L4 at the opposite ends of a diagonal of a field F2. The purpose of this arrangement is two-fold; first, the lights being on the diagonal of the field, any possible glare of the light will not interfere with planes landing on the field; secondly, the lights facing each other, if properly synchronized, will sweep the center line at the same time, again providing the double illumination in the central portion of the field, or runway, which incoming pilots should use for landing. There are other arrangements which may be installed for various purposes, such as mounting lights on the sides of the field or in any other manner which will be found adaptable for other purposes. My invention is intended to cover all the positions in which an oscillating light may be mounted to illuminate any field or object.

In Figure 3, I have shown another adaptation of my invention. Here it will be observed is a billboard B of the ordinary construction having an oscillating light arrangement L5 mounted in front thereof. The light L5 is adapted to cast a light beam of the shape shown by lines 11 and 12 on the billboard B. The illuminated portion of the board will then be between lines 11 and 12. It becomes obvious, therefore, that as the lamp L5 is oscillated, the illuminated portion between the lines 11 and 12 will sweep the billboard B. If the frequency of oscillations is of the order of 7 times per second or more, the result will be a substantially constant, uniform illumination over the entire board.

In Figures 4 and 5, I have shown one form of an oscillating light for my purpose. There may be other and various forms which I do not attempt to show. In these views the lamp L may consist of a more or less conventional searchlight, or it may be any light source from which parallel light rays are projected. In practice, I recommend any light source whereby parallel rays may be projected, but prefer to utilize a source of light having some sort of cylindrical lens arrangement for producing a narrow vertical wedge of light rather than a round light beam. Lamp L may be pivotally mounted upon a base 13 in any suitable manner, the base 13 in turn being supported on a platform 13' or any other construction suitable for the purpose. As before stated, the means for oscillating the lamp may take a variety of forms. In order to show a simplified means for this purpose, I have illustrated the lamp as being driven by an electric motor M, which in turn drives a disc 14 having a pin 15 adjustably mounted therein. The pin 15 serves as a pivot point for a connecting rod 16, which in turn is pivotally connected to the case 17 of the lamp L. The pin 15 may be inserted in any of the holes 15' in the disc 14 to regulate the extent of the oscillating movement of the lamp. This entire arrangement is simple in construction and suitable for the purpose. An arrangement of this nature could be used as a searchlight for scanning skies to locate airplanes and the like and would have the advantage of covering a large area with a single light. The motor M may be of the "Selsyn" interlock motor type or it may be a synchronous motor which is suitably mounted on the base 13. The interlock type of motor would only be used where more than one light is installed. However, synchronous motors could also be used where more than one light is oscillated, but this arrangement would require some additional means for adjusting the sweep of the light beams so that they would align and merge to produce an intensified beam at the proper point. When set up as illustrated in Figure 1, the motors M1 and M2 of the lights L1 and L2 are interlocked and driven by suitable "Selsyn" electrical connections or, in the case synchronous motors are used, a means for synchronizing the sweep of the light beams is employed to adjust the spacing of the two beams so that the lights L1 and L2 will oscillate equally and oppositely to each other at the same frequency. The same set-up would be used with reference to Figure 2, except that in this case the lamps L3 and L4 would not necessarily have to oscillate oppositely to each other but would have to be synchronized so that they would oscillate at the same frequency to make their beams cross at the center. In Figure 3 the driving means for the light would not necessarily have to be an interlocked motor drive. Any ordinary motor would serve for the purpose here.

In Figure 6, I have shown a different form of means for producing the flashing light. As stated previously in the specification, the invention is intended to include not only oscillating lights but rotating light beams with or without reflectors, prisms, lenses, etc., in combination therewith. Figure 6 is intended to illustrate merely another form for accomplishing the same purpose and in no wise is intended to limit the invention to the form shown, since there are other ways of accomplishing the same result. Here it will be noted is a light 18 of any suitable type. The light 18 is backed by a reflector 19. Passing around the light and the reflector is a rotating sleeve 20. At intervals around this sleeve 20 are cylindrical lenses 21. As the sleeve 20 rotates, the lenses 21 will pass in front of the light 18 and the reflector 19 and will transmit a series of traveling narrow light beams generally designated 22. These beams can be arranged to sweep the field and the extent to which they sweep the field may be controlled by another stationary shutter 23 disposed in a circumference outside the sleeve 20 and the lenses 21. An arrangement of this sort will provide the traveling beams which, due to the uniform rotary movement of the sleeve 20, will travel in a more or less uniform speed across any field to be illuminated, and will not tend to increase the light at the margins of the field. Another arrangement would be to eliminate the reflector 19 and the shutter sleeve 23 and to set the device in the center of the field to be illuminated.

The foregoing described method may be practiced in other ways and by means other than those shown here.

I claim:

1. A method for illuminating a field consisting in cyclically moving a pair of beams of light over the surface of said field at a frequency to produce substantially steady, visual illumination on said field, the movement of said beams being in synchronous relation to each other to cause said beams to merge at a predetermined point to produce an area of intensified illumination in said field.

2. In combination a pair of light beams adapted to be moved over the surface of a field, means for moving said light beams at a frequency to produce substantially steady visual illumination on said field and in synchronous relation to each other to cause said beams to merge at a predetermined point to produce an area of intensified illumination on said field.

HARRY MILLS LEONARD.